US007297388B2

(12) United States Patent
Dimond et al.

(10) Patent No.: US 7,297,388 B2
(45) Date of Patent: Nov. 20, 2007

(54) PHOTO-LUMINESCENT PIGMENT APPLICATION

(75) Inventors: George Trevor Dimond, Christchurch (NZ); Paul Rodney Sapsford, Christchurch (NZ)

(73) Assignee: Ecoglo Limited, Christchurch (NZ)

( * ) Notice: Subject to any disclaimer, the term of this patent is extended or adjusted under 35 U.S.C. 154(b) by 99 days.

(21) Appl. No.: 10/734,321

(22) Filed: Dec. 12, 2003

(65) Prior Publication Data

US 2004/0126567 A1 Jul. 1, 2004

Related U.S. Application Data

(62) Division of application No. 10/031,182, filed as application No. PCT/NZ00/00127 on Jul. 17, 2000, now Pat. No. 6,726,952.

(51) Int. Cl.

| | |
|---|---|
| ***B32B 3/00*** | (2006.01) |
| ***B32B 9/00*** | (2006.01) |
| ***B60Q 1/02*** | (2006.01) |
| ***F21K 2/00*** | (2006.01) |
| ***B65G 15/00*** | (2006.01) |
| ***B66B 1/34*** | (2006.01) |
| ***E04F 15/00*** | (2006.01) |

(52) U.S. Cl. ...................... 428/172; 428/690; 428/914; 362/146; 362/481; 250/462.1; 198/335; 198/337; 187/391

(58) Field of Classification Search ................ 428/690, 428/172, 917, 67; 362/146, 481; 52/179; 187/391; 198/335, 337; 250/462.1
See application file for complete search history.

(56) References Cited

U.S. PATENT DOCUMENTS

| | | | | |
|---|---|---|---|---|
| 3,740,833 | A | | 6/1973 | Hanson et al. |
| 3,983,263 | A | | 9/1976 | Weiss et al. |
| 4,522,861 | A | * | 6/1985 | Dunsworth ................ 428/192 |
| 4,998,391 | A | * | 3/1991 | Connew ..................... 52/179 |
| 5,020,256 | A | * | 6/1991 | French ........................ 40/661 |
| 5,192,027 | A | | 3/1993 | Delmer et al. |
| 5,453,292 | A | | 9/1995 | Gerland et al. |
| 5,639,514 | A | | 6/1997 | Jones et al. |
| 5,698,301 | A | | 12/1997 | Yonetani |
| 5,897,738 | A | | 4/1999 | Rajan et al. |
| 5,904,017 | A | * | 5/1999 | Glatz et al. ................ 52/287.1 |
| 6,074,739 | A | | 6/2000 | Katagiri |
| 6,237,266 | B1 | * | 5/2001 | Tassey et al. ................. 40/542 |
| 6,242,056 | B1 | | 6/2001 | Spencer et al. |

FOREIGN PATENT DOCUMENTS

| | | |
|---|---|---|
| GB | 2234539 | 6/1991 |
| JP | 06299099 A | 10/1994 |
| WO | 96/26991 | 6/1996 |

* cited by examiner

*Primary Examiner*—Donald J. Loney
(74) *Attorney, Agent, or Firm*—Greer, Burns & Crain, Ltd.

(57) ABSTRACT

A method of applying photo-luminescent pigment to a substrate, such as an aluminum or metal strip containing channels or depressions, includes preparing a dry powder formulation including a photo-luminescent pigment and a carrier/fixer, depositing the dry powder formulation onto the substrate surface, and heating to fuse the dry powder formulation to the substrate surface. The photo-luminescent pigment can be applied using an apparatus which includes a hopper adapted to contain a dry powder formulation, one or more orifices adapted to allow transfer of the dry powder formulation from the hopper to a substrate surface and a guide rail system for locating the substrate surface in both a fixed horizontal plane and a fixed vertical plane below the hopper and orifice.

10 Claims, 3 Drawing Sheets

PHOTO-LUMINESCENT PIGMENT APPLICATION

This application is a divisional application of application Ser. No. 10/031,182, filed Jun. 3, 2002, now U.S. Pat. No. 6,726,952, filed as a 371 of Application No. PCT/NZ00/00127 filed Jul. 17, 2000.

BACKGROUND OF THE INVENTION

1. Field of the Invention

The invention relates to a method and apparatus for applying photo-luminescent pigment to a substrate surface, more particularly for applying photo-luminescent pigment to aluminum or other metal strips used, for example, as stair nosings. The invention also relates to a product produced by the method and apparatus.

2. Background to the Invention

Low level floor or walkway lighting is commonly used in such places as picture theaters, sports arenas and aircraft as both a courtesy and safety feature for patrons or passengers. This lighting often takes the form of an electrical or electronic lighting means in or on the floor along either side of a walkway or across the nosing of stairs. Low level floor lighting is particularly important in picture theaters and sports arenas where patrons may be required to negotiate steps in aisles when only low levels of ambient light are present, or in stairwells of buildings during an emergency when there may be failure of the main lighting source.

Known methods of floor lighting using electrical or electronic means have a disadvantage because they require electrical wiring to be run to areas where access for the wiring may be limited. They are also prone to failure during failure of the main power supply. Additionally, the electronic lighting means are often of a low voltage type requiring some form of voltage reduction means such as an inverter, converter, or transformer. Not only does addition of this equipment add to the complexity and cost of the installation but also provides for additional modes of failure.

It is known to apply a photo-luminescent pigment to a rope, tape or fabric. This photo-luminescent pigment is stimulated by visible light and remains luminescent for a considerable period after the light source is removed. The problem with tape or fabric impregnated with pigment is that it lacks durability for heavy wear areas such as walkways or stairs.

Photo-luminescent pigment has been sprayed onto more durable substrate surfaces such as aluminum or metal strips or extrusions. Once the spray has dried, it is ground to provide a smooth finished surface. This overcomes the abovementioned problems associated with heavy wear areas, but considerable pigment is wasted during the spraying and grinding process.

Accordingly it is an object of the present invention to provide a method and apparatus for applying photo-luminescence pigment to a substrate which avoids or overcomes some of the abovementioned disadvantages, or which at least provides the public with a useful choice.

SUMMARY OF THE INVENTION

According to a first aspect of the invention there is provided a method of applying photo-luminescent pigment to a substrate, the method including:

preparing a dry powder formulation including, at least, a photo-luminescent pigment and a carrier/fixer;

depositing the dry powder formulation onto a substrate surface;

heating the dry powder formulation to fuse it to the substrate surface.

Preferably the substrate surface has depressions or channels adapted to receive the dry powder formulation.

Preferably a light reflecting layer is applied to the substrate surface before depositing the dry powder formulation.

Preferably the volume ratio of photo-luminescent pigment to carrier/fixer in the dry powder formulation is such that the fused material exhibits substantially the same strength and durability properties of the carrier/fixer, while still exhibiting the photo-luminescent properties of the pigment. More preferably the volume ratio is substantially in the range of 1% to 35% photo-luminescent pigment to carrier/fixer.

Preferably the dry powdered formulation may be heated to between, substantially, 160 to 210 degrees centigrade, or to a temperature recommended by the manufacturer of the carrier/fixer, for approximately 10 to 20 minutes or until the formulation is molten. The molten formulation may be cooled after heating.

Preferably the carrier/fixer is a heat curable polymer.

Preferably the dry powder formulation may include small quantities of additives, such as a de-gassing additive, to ensure a smooth surface finish.

Preferably the substrate is stamped, extruded or milled aluminum or metal.

According to a second aspect of the invention there is provided an apparatus for applying photo-luminescent pigment to a substrate, the apparatus including:

a hopper adapted to contain a dry powder formulation;

one or more orifices adapted to allow transfer of the dry powder formulation from the hopper to a substrate surface;

a guide rail system for locating the substrate surface in both a fixed horizontal plane and a fixed vertical plane below the hopper and orifice; and a heat-curing system for providing enough heat to turn the dry powder formulation into a molten mix.

Preferably the apparatus also includes a cooling system to cool the molten mix.

Preferably the apparatus also includes a drive system to move the substrate through the apparatus.

Preferably the apparatus includes a support roller mounted directly beneath the orifice(s) and hopper to support the substrate.

Preferably the apparatus includes an adjustable mounting bracket adapted to enable the hopper to be located in the correct position so that the orifice(s) lines up with the substrate.

Preferably the orifice is adapted to communicate snugly with the substrate surface such that the dry powder formulation is deposited substantially only where required.

Preferably the apparatus includes a mechanism for tapping or shaking the hopper so that any voids in the dry powder formulation are re-filled.

Preferably the apparatus includes a brush mounted below the roller, and with its bristles in contact with the roller, so that any powder that falls onto the roller is subsequently brushed off.

The heat-curing system may be an oven. Optionally, the heat-curing system may be a continuous oven process, and in one embodiment may include infra-red heating elements.

Preferably the apparatus includes an automatic loading and unloading means at each end thereof.

The invention also provides for a product when produced according to the process, or by an apparatus, herebefore defined.

Further aspects of the invention will become apparent from the following description which is given by way of example only.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE INVENTION

Figure 1:
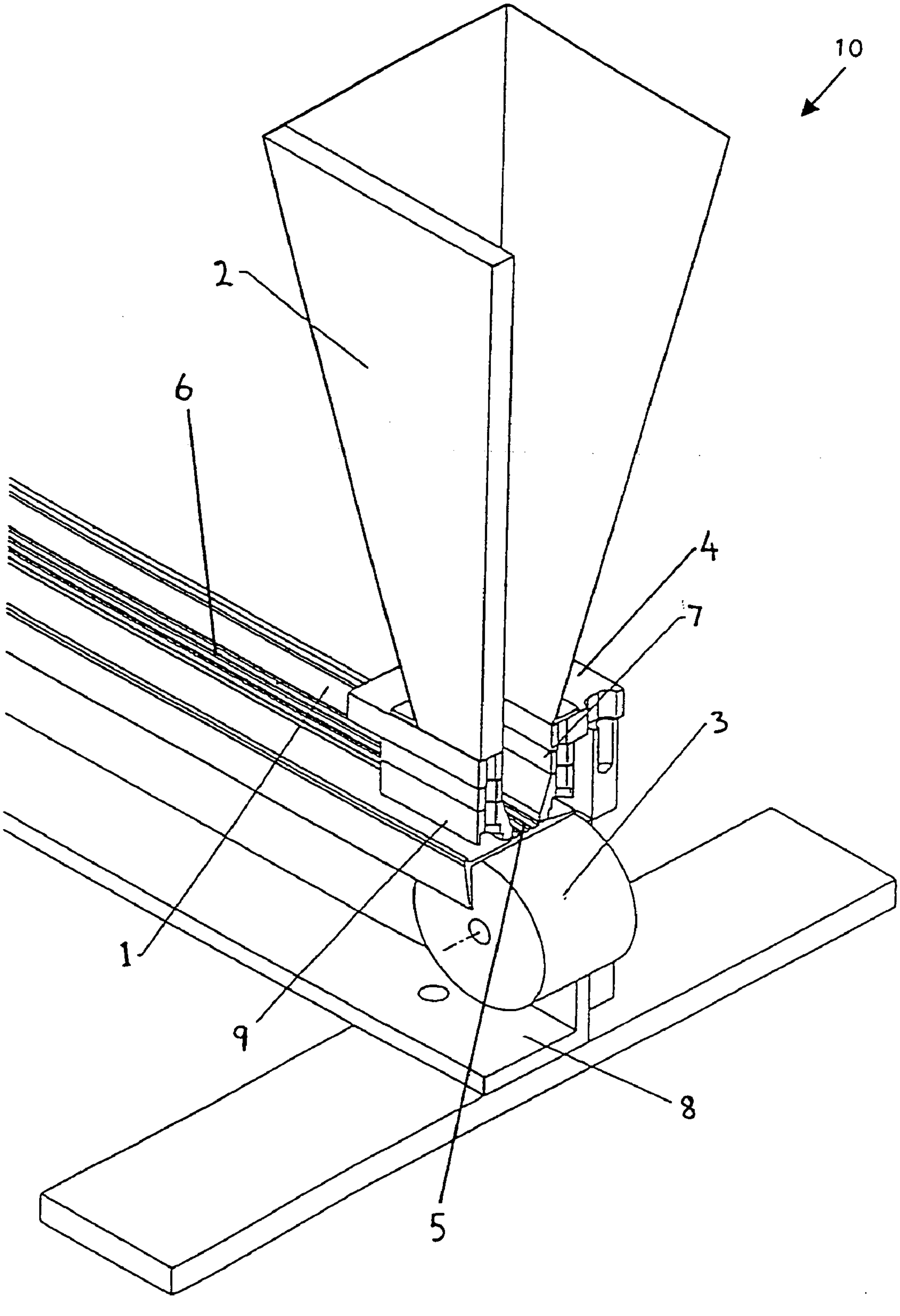
FIG. 1 illustrates a perspective cross section view through a hopper according to the invention.

The invention provides for a method and apparatus for applying photo luminescent pigment, which is stimulated by UV and visible light and will remain illuminated for a period after the light source is removed, to a substrate such as aluminum or metal strips. The resulting substrate can be used to provide floor, stair or other courtesy or emergency lighting in public areas.

The process involves filling depressions or channels in a substrate material (typically, but not exclusively, an aluminum extrusion or stamped or milled sheet of aluminum) with a dry powder formulation that contains a photo luminescent pigment; a carrier/fixer (typically a heat curable polymer); and preferably small quantities of additives (such as a flow additive and/or de-gassing additive) that improve the melt properties of the mix and ensure a smooth surface finish. Sufficient heat is applied to the combined formulation to melt and cure it, and when cooled it fuses to itself and to the substrate.

In order to improve the effectiveness of the photo-luminescent formulation a light reflective layer can be applied to the substrate before depositing the formulation.

The depressions or channels in the substrate are filled up with the dry powder formulation to be level with the top surface of the substrate material. When the formulation becomes molten the air between the particles is expelled and the subsequently fused material forms a thick film that smoothly covers both the horizontal and vertical surfaces of the depressions or channels in the substrate. Because the surface of the fused formulation is lower than the highest point of the depressions or channels it is protected from wear and is suited to use in floor illumination situations.

While a number of products suitable for such a photo-luminescent formulation may be apparent to a skilled artisan, the products used in the current invention are LUMINOVA, a photo-luminescent pigment from Nemoto Japan; and TPE, a carrier/fixer produced by Dulux New Zealand. The flow and de-gassing additives are also produced by Dulux New Zealand.

The ratio of photo-luminescent pigment to carrier/fixer in the dry powder formulation is dependent on the intensity and duration of illumination desired. If greater intensity and duration of illumination is desired, more pigment is added. A typical formulation will contain between 30% and 60% photo luminescent pigment powder by weight. However, because the specific gravity of the powder is typically 3-4 times greater than the rest of the dry powder formulation, the photo luminescent pigment volume ratio is typically in the range 10% to 30%.

Because the photo-luminescent pigment makes up a relatively small part of the total volume of the fused material the fused material exhibits substantially the same strength and durability properties that the carrier/fixer would have without the inclusion of the photo luminescent pigment, but it also has the added property of being photo-luminescent. Success has been achieved with volume ratios between 1% and 35% photo-luminescent pigment.

The principle of the process is to pass the substrate material, with the channels or depressions facing upwards, below a hopper which is filled with the dry powder formulation. The hopper has one or more bottom orifices which is shaped so that the dry powder formulation will fall under its own weight into the channels or depressions and will not spill on either side of the substrate. As the substrate passes under the hopper the lower surface of the bottom orifice(s) wipe the top surface of the substrate material clean so that the only dry powder formulation that is removed from the hopper is that which fills the channels or depressions. The channels or depressions are filled to be level with the top surface of the substrate. Heat is then applied to cure the dry powder formulation. After heating, the formulation may be cooled.

Individual pieces of the substrate material are successively passed underneath the hopper in such a way that no substantial quantities of the dry powder formulation fall between the tail end of one piece and the lead edge of the subsequent piece.

Figure 2:
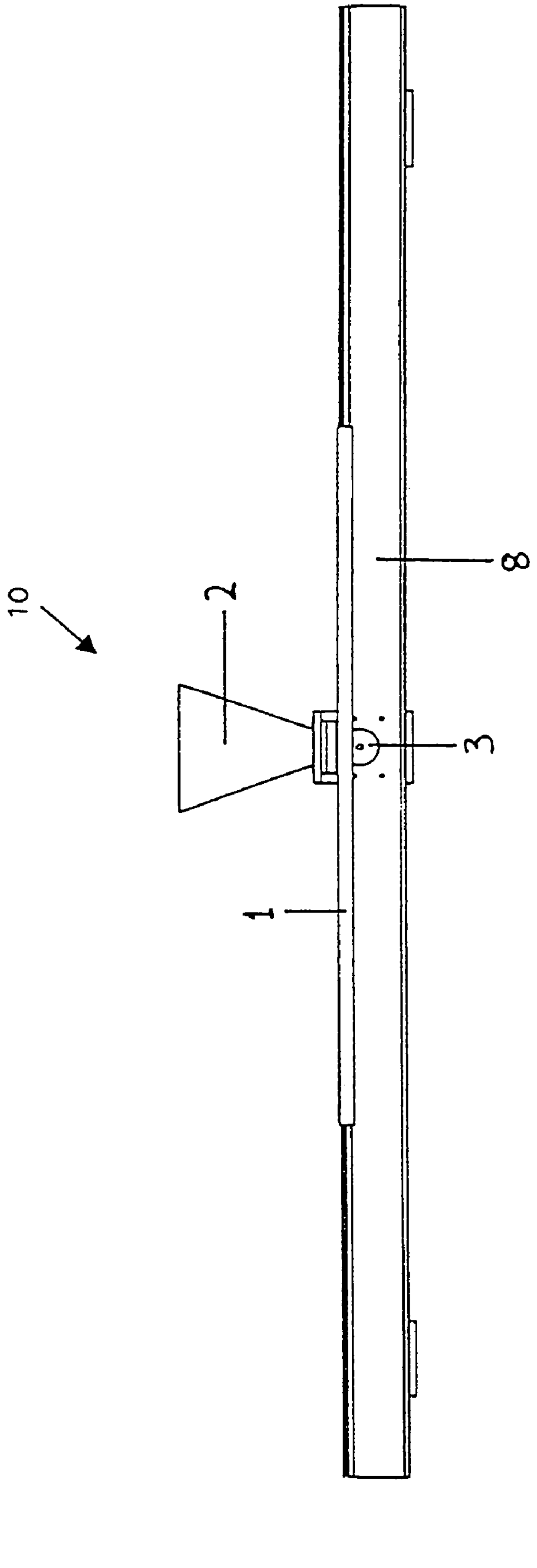
FIG. 2 illustrates an elevation view of the hopper and a feed table.
Figure 3:
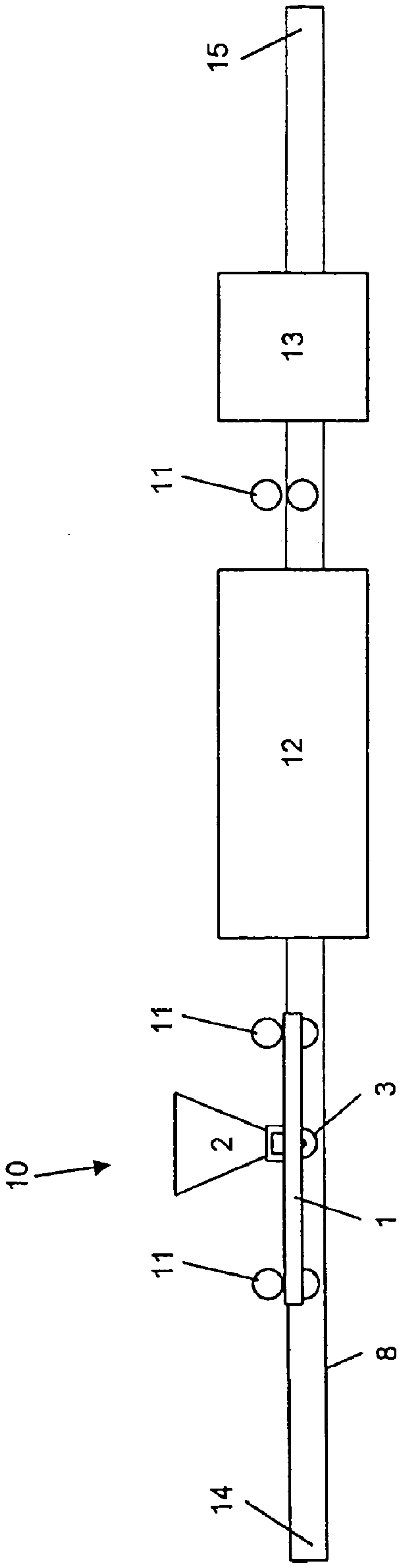
FIG. 3 illustrates a schematic overview of one embodiment of an apparatus according to the invention.

FIGS. 1 and 2 illustrate, in detail, the hopper section 10 of an apparatus for applying photo luminescent material to a substrate. FIG. 3 illustrates a schematic overview (not to scale) of the whole apparatus, each aspect of which will now be described.

The apparatus includes a guide rail system 8 for locating the individual substrate pieces, in this case aluminum extrusion 1, in both a fixed horizontal plane and a fixed vertical plane.

A drive system is used to push individual substrate pieces past (below) a hopper 2. This drive system may be a human operator, or it may be a system of motorised rollers 11 that engage with one or two faces of the individual substrate pieces. Also, a support roller 3 may be motorised to drive the extrusion 1 below hopper 2. In an automated embodiment of the apparatus the motorised rollers 11 and 3 may be operated from a variable speed motor drive which may interface with a controller.

The hopper section 10 includes the hopper 2, preferably with steep sides to avoid build-up of product, that might hold typically, but not exclusively, 1 to 1.5 kg of dry powder formulation. The hopper 2 shown in FIG. 1 is cut-away for illustration purposes.

An adjustable mounting bracket 4 may also be included to enable the hopper 2 to be located in the correct position so that a bottom orifice 5 lines up with channels or depressions 6 in the extrusion 1. Orifice 5 may be formed in a die 9, which is adapted to suit the extrusion 1 being used. The die 9 would abut snugly over extrusion 1 so that no formula was spilled or wasted. Various dies may be interchangeable to provide for different substrates. The dies may have more than one orifice—for example a two orifice die for a two channel or depression substrate.

There is a compressible foam rubber insert 7 between the hopper body 2 and the bottom orifice 5, which suspends the bottom orifice in such a way that it will still seal against the extrusion 1 even if the extrusion is not perfectly lined up with the hopper.

The support roller 3 is mounted directly beneath the bottom orifice 5 of the hopper 2 to support the extrusion 1 without imposing excessive friction. This allows the extrusion 1 to be readily moved through the system. Roller 3 may be motorised but this is not essential as its main function is to hold the extrusion 1 up to the orifice 5. A bristle brush (not shown) may be mounted directly below the roller 3, with its bristles in contact with the roller, so that any powder that falls onto the roller is subsequently brushed off and will not build up on the roller.

A mechanism (not shown) for tapping the hopper 2 at regular intervals can be provided so that any voids in the dry power are re-filled. Typically the tapping action will occur once every 30-60 seconds of operation, which is not enough to allow the different components of the dry powder formulation to separate substantially. In its simplest form this "mechanism" may in fact be the hand of a human operator, but ideally this function is carried out by a solenoid or air actuated arm. Alternatively an auger or screw may be included which either continuously or intermittently "mixes" the formula, thereby filling any voids.

The apparatus also includes a heat-curing system, for example an oven, 12 to provide enough heat to melt and cure the dry powder formulation, and bond it to the substrate. This could be an oven with a rack system. After the individual substrate pieces have had their channels or depressions filled with the dry powder formulation they are loaded by hand onto the racks. When the racks are full the racks are placed in the oven for the required time. Using this system a typical curing cycle may be 10 to 20 minutes at 160° C. to 200° C.

In an automated apparatus the oven 12 would most preferably be a continuous tunnel process so that after the individual substrate pieces have had their channels or depressions filled with the dry powder formulation they immediately enter the curing tunnel 12 that rapidly heats them to typically 160° to 200° C. for a sufficient time to turn the dry powder formulation into a molten mix and bond it to the substrate. The individual substrate pieces then emerge from the opposite end of the tunnel. A cooling tunnel 13 may also be provided.

The curing tunnel 12 could be either a hot-air type oven or an infra-red oven. At present the applicant has found that the hot-air type oven produces the best result. However, infra-red ovens provide a much faster and more direct heating method. The problem with infra-red ovens is that the rapid localised heating causes distortion of the substrate material. The degree of distortion is dependent on the form and type of substrate material. It is envisaged that with improvements in infra-red heating technology and substrate materials this will become the preferred method.

The above-described system may be fully automated if required by the use of automatic loading and unloading magazines at each end, 14 and 15 respectively, of the production line 8. Automation of such a system, using for example a programmable logic controller or PC based control system, is well within the capability of one skilled in the art and will not be discussed further.

The photo-luminescent pigment application process will now be described, by way for example only, to illustrate the method of the invention.

A representative piece of substrate is placed on the guide rail 8 close to the empty hopper 2, then passed into the gap between the bottom orifice 5 of the hopper and the support roller 3. The position of the hopper assembly 10 is adjusted as necessary to ensure that the bottom orifice 5 lines up with the channels or depressions 6 in the substrate, and there are no gaps to either side that would let powder escape. The hopper 2 is then filled with a thoroughly mixed quantity of the dry powder formulation.

The first piece of "production" substrate is then placed on the guide rail 8, immediately behind the representative piece of substrate, and moved towards the hopper assembly 10. In this way it pushes the representative piece of substrate through and past the hopper assembly 10 and onto the guide rail 8 on the other side of the hopper assembly. The representative piece of substrate can subsequently have the powder that has been applied to it removed by a vacuum cleaning head and then the substrate can be reused as a plug for the hopper's bottom orifice 5 whenever production is halted.

Before the first piece of production substrate is pushed right through the hopper assembly 10 the second piece of production substrate is picked up off a magazine and placed on the guide rail 8 immediately behind the first piece of production substrate. Once the first piece of production substrate is away from the hopper assembly 10 it can be taken off the guide rail 8 and placed on racks ready for oven curing.

The above step is then repeated until the oven racks are full. The racks are placed in the oven 12 for the required curing cycle, then removed from the oven and allowed to cool before final inspection and packaging.

At regular intervals, as required, the hopper 2 is tapped to remove voids in the powder and the hopper is refilled with thoroughly mixed dry powder formulation.

When the production run has finished, the representative piece of substrate can be reused as a plug for the hopper's bottom orifice 5 and finally any left-over powder can be removed from the hopper 2.

It can readily be seen that whereas the above description describes the method of operation for a non-mechanised form of the apparatus the process can readily be automated using the optional automating equipment described above so that the process becomes either semi-automatic or fully automatic. Such automation would be well within the capabilities of the nominally skilled person.

Photo-luminescent formulation can be applied, by the above-described method, to articles having channelled surfaces for use in such places as picture theaters, sporting arenas, aircraft aisles and building corridors/stairways where the illumination can be adapted in guiding people to an exit in an emergency or when normal lighting fails. Two examples of articles are step nosings and handrails.

A step nosing is the angled member across the front edge of a step. The current invention can be used to deposit photo-luminescent formulation within castellations, or recessed channels, in the top surface of a step nosing. This results in a step nosing which is luminescent for an extended period after ambient illumination is switched off, and hence helps maintain the safety of spectator areas in picture theaters, sporting arenas and the like in low light situations. The extrusion 1 illustrated in FIG. 1 is a step nosing with castellations, or recessed channels, 6 in its top surface.

In a further embodiment the photo-luminescent formulation might be deposited within castellations, or recessed channels, of a insert strip which engages with the top surface of a step nosing. This would allow the photo-luminescent insert strip to be replaced without replacing the whole step nosing.

Photo-luminescent formulation could also be deposited within castellations, or recessed channels, on stair and other handrails. The castellations, or recessed channels, carrying the photo-luminescent formulation may be part of a replaceable insert strip.

Where in the foregoing description reference has been made to integers or elements having known equivalents, then such equivalents are herein included as if individually set forth.

Particular examples of the invention have been described and it is envisaged that improvements and modifications can take place without departing from the scope of the appended claims.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A photo-luminescent device, comprising:

a substrate having at least one of a channel or a depression formed therein; and an exposed and uncovered photo-luminescent material located and being filled to below a top of any given said one of a channel or a depression, said photo-luminescent material being a dry powder formulation fused directly to said one of a channel or a depression and composed substantially of a photo-luminescent pigment and a carrier/fixer;

where said photo-luminescent material exhibits substantially the same strength and durability properties as said carrier/fixer.

2. The photo-luminescent device of claim 1, wherein said substrate is one of a step nosing and a handrail.

3. The photo-luminescent device of claim 1, wherein each said one of a channel or a depression is formed of a plurality of substrate-interior surfaces, each said substrate interior surface of at least one said one of a channel or a depression being covered with a thick-film of said photo-luminescent material.

4. The photo-luminescent device of claim 1, wherein said photo-luminescent material is finally formed upon cooling from a molten mix state thereof.

5. A photo-luminescent device created by preparing a dry powder formulation, providing a substrate having one of a depression or a channel therein, the one of a depression or a channel being adapted to receive the dry powder formulation, depositing the dry powder formulation onto the substrate to thereby fill the one of a depression or a channel, the formulation being deposited by operation of gravity, and heating the dry powder formulation to fuse it to the substrate to thereby create a fused material, the photo-luminescent device comprising:

said substrate having at least one of a channel or a depression therein, each said at least one of a channel or a depression including a plurality of surfaces; and the fused photo-luminescent material being uncovered and located and extending to below a top of at least one said one of a channel or a depression, said photo-luminescent material being in the form of a thick film on said surfaces of said at least one said one of a channel or a depression, said photo-luminescent material being contained entirely within said at least one said one of a channel or a depression.

6. The photo-luminescent device of claim 5, wherein said substrate is one of a handrail and a step nosing.

7. The photo-luminescent device of claim 5, wherein said photo-luminescent material is composed substantially of a photo-luminescent pigment and a carrier/fixer.

8. The photo-luminescent device of claim 5, wherein said substrate is metallic.

9. A photo-luminescent device created by preparing a dry photo-luminescent powder formulation, providing a substrate having one of a depression or a channel therein, the one of a depression or a channel being adapted to receive the dry powder formulation, depositing the dry powder formulation onto the substrate to thereby fill the one of a depression or a channel, the formulation being deposited by operation of gravity, and heating the dry powder formulation to fuse it to the substrate to thereby create a fused material, the photo-luminescent device comprising:

said substrate having at least one of a channel or a depression including a plurality of surfaces, said substrate being metallic and one of a handrail and a step nosing;

said fused photo-luminescent material being uncovered and located and extending to below a top of at least one said one of a channel or a depression, said photo-luminescent material being in the form of a thick film on said surfaces, said photo-luminescent material being contained entirely within said at least one said one of a channel or a depression, said photo-luminescent material being composed substantially of a photo-luminescent pigment and a carrier/fixer.

10. The photo-luminescent device of claim 9 wherein said at least one of a channel or a depression is a plurality of channels or depressions arranged generally parallel to each other along a longitudinal axis of said substrate, wherein said photo-luminescent material is filled to below a top surface of said channels or depressions to preserve traction on said substrate.

* * * * *